US012202020B2

(12) United States Patent
Bordy

(10) Patent No.: US 12,202,020 B2
(45) Date of Patent: Jan. 21, 2025

(54) METHOD OF UTILIZING A HANDHELD BOTTLE WASHER

(71) Applicant: Matthew Bordy, Fort Lauderdale, FL (US)

(72) Inventor: Matthew Bordy, Fort Lauderdale, FL (US)

( * ) Notice: Subject to any disclaimer, the term of this patent is extended or adjusted under 35 U.S.C. 154(b) by 0 days.

(21) Appl. No.: 18/378,445

(22) Filed: Oct. 10, 2023

(65) Prior Publication Data

US 2024/0066569 A1 Feb. 29, 2024

Related U.S. Application Data

(62) Division of application No. 17/897,810, filed on Aug. 29, 2022, now Pat. No. 11,779,966.

(51) Int. Cl.

*B08B 9/08* (2006.01)
*A46B 5/00* (2006.01)
*A46B 15/00* (2006.01)
*B08B 1/12* (2024.01)

(Continued)

(52) U.S. Cl.

CPC .......... *B08B 9/0808* (2013.01); *A46B 5/0012* (2013.01); *A46B 5/0025* (2013.01); *A46B 5/0033* (2013.01); *A46B 5/0045* (2013.01); *A46B 15/0097* (2013.01); *B08B 1/12* (2024.01); *B08B 9/0804* (2013.01); *B08B 9/087* (2013.01); *B08B 9/20* (2013.01); *B08B 2209/08* (2013.01)

(58) Field of Classification Search

CPC ... A46B 5/0012; A46B 5/0025; A46B 5/0033; A46B 5/0037; A46B 5/0045; A46B 15/0097; B08B 9/0804; B08B 9/0808; B08B 9/0826; B08B 9/087; B08B 9/20; B08B 2209/08; B08B 2209/027; B08B 1/12

See application file for complete search history.

(56) References Cited

U.S. PATENT DOCUMENTS 444,710 A * 1/1897 McPherson
1,186,400 A * 6/1916 Horodyski .............. A46B 5/00 15/165

(Continued)

FOREIGN PATENT DOCUMENTS

CN 108480344 A * 9/2018

*Primary Examiner* — Randall E Chin
(74) *Attorney, Agent, or Firm* — Johnson | Dalal; Mark C. Johnson

(57) ABSTRACT

A method of utilizing a handheld bottle washer that includes compressing two flexible opposing sidewalls of the bottle washer with an external compression force to generate a dynamic position with a diameter of the enclosed washing aperture, inserting the two flexible opposing sidewalls into an opening of a bottle while in the dynamic position, releasing the external compression force causing the two flexible opposing sidewalls to expand outwardly to generate a static position with the diameter of the enclosed washing aperture greater than the diameter of enclosed washing aperture when in the dynamic position and with the cleaning material on the outer surfaces of each of the two opposing sidewalls contacting the inner surfaces of the bottle, and applying a downward force on the lower end of the handheld body to move the cleaning material on the inner surfaces of the bottle for cleaning.

6 Claims, 6 Drawing Sheets

(51) Int. Cl.
*B08B 9/087* (2006.01)
*B08B 9/20* (2006.01)

(56) References Cited

U.S. PATENT DOCUMENTS

| | | | | | |
|---|---|---|---|---|---|
| 1,827,569 | A * | 10/1931 | Edgar | A46B 5/00 | 15/165 |
| 2,432,924 | A * | 12/1947 | Nishizaka | A46B 5/00 | 15/212 |
| 4,317,249 | A * | 3/1982 | Benson | B08B 9/087 | 15/213 |
| 6,892,416 | B2 * | 5/2005 | Lee | A46B 5/06 | 15/59 |
| 7,467,905 | B2 * | 12/2008 | Habatjou | A46B 9/021 | 401/126 |
| 10,791,823 | B2 * | 10/2020 | Lee | A46B 15/0097 | |
| D934,570 | S * | 11/2021 | Bram | D4/132 | |
| 2006/0260079 | A1 * | 11/2006 | Horton | A46B 5/0012 | 15/165 |

* cited by examiner

METHOD OF UTILIZING A HANDHELD BOTTLE WASHER

FIELD OF THE INVENTION

The present invention relates generally to bottle washers, and, more particularly, relates to handheld non-motorized bottle washers.

BACKGROUND OF THE INVENTION

Containers or bottles (generally referred to herein as a "bottle") are used by many users and/or consumers. For cost, the environment, or other reasons, many users desire to keep their bottles. These bottles generally include a bottom wall, a sidewall, and an upper opening that may be coverable with a top. When these bottles are kept by users, they are required to be cleaned, which come with many challenges. For example, the configuration and/or size of the bottle prevents a user from accessing certain inside surfaces of the bottle.

Some known bottle cleaning or washing devices include having a handle with a distal end having a cleaning surface, e.g., bristles, disposed thereon. This requires the user to maneuver the distal end within the bottle in order to clean all of the inside surfaces. Oftentimes, however, the user is unable to clean all inside surfaces because of the inside surface configuration or the length and geometry of the bottle, namely around the neck area of the bottle or bottom half. Further, the time it takes to clean the bottle is often time consuming and/or impracticable with such devices.

Therefore, a need exists to overcome the problems with the prior art as discussed above.

SUMMARY OF THE INVENTION

The invention provides a method of utilizing a bottle washer that overcomes the hereinafore-mentioned disadvantages of the heretofore-known devices and methods of this general type and that quickly, effectively, and efficiently cleans the inside surface (or outside surface) of a bottle.

With the foregoing and other objects in view, there is provided, in accordance with the invention, a method of utilizing a handheld bottle washer that includes providing a handheld body with a lower end, with an upper end opposing the lower end, with a body length separating the lower and upper ends of the handheld body, a longitudinal direction spanning from the lower end of the handheld body to the upper end of the handheld body, with two flexible opposing sidewalls joined together at a lower joint and at an upper joint and each having an outer surface and an inner surface, defining an enclosed washing aperture with the two flexible opposing sidewalls, and with a cleaning material disposed on the outer surfaces of each of the two opposing sidewalls, compressing the two flexible opposing sidewalls with an external compression force to generate a dynamic position with a diameter of the enclosed washing aperture, inserting the two flexible opposing sidewalls into an opening of a bottle while in the dynamic position, releasing the external compression force causing the two flexible opposing sidewalls to expand outwardly to generate a static position with the diameter of the enclosed washing aperture greater than the diameter of enclosed washing aperture when in the dynamic position and with the cleaning material on the outer surfaces of each of the two opposing sidewalls contacting the inner surfaces of the bottle, and applying a downward force on the lower end of the handheld body to move the cleaning material on the inner surfaces of the bottle for cleaning.

In accordance with another feature, an embodiment of the present invention includes the cleaning material being formed by a plurality of bristles disposed on and radially extending outward from the outer surfaces of each of the two opposing sidewalls.

In accordance with yet another feature, an embodiment of the present invention includes applying the downward force on the lower end of the handheld body to mold the plurality of bristles disposed on and radially extending outward from the outer surfaces of each of the two opposing sidewalls to a geometry formed by the inner surfaces of the bottle.

In accordance with another feature, an embodiment of the present invention includes applying the downward force on the lower end of the handheld body to mold the cleaning material a geometry formed by the inner surfaces of the bottle.

In accordance with a further feature, an embodiment of the present invention includes the handheld body having a first gripping surface of an arcuate shape and disposed on the outer surface of one of the two opposing sidewalls and a second gripping surface of an arcuate shape and disposed on the outer surface of another of the two opposing sidewalls, the cleaning material formed with a plurality of bristles disposed on and radially extending outward from the outer surfaces of each of the two opposing sidewalls and not located on the first and second gripping surfaces, wherein the first and second gripping surfaces are proximal to the plurality of bristles disposed on the outer surfaces of the respective the two opposing sidewalls.

In accordance with another feature, an embodiment of the present invention includes the handheld body having a center diameter separating two opposing inner surfaces of each of the opposing two flexible opposing sidewalls.

The invention also includes a handheld body with a lower end, with an upper end opposing the lower end, with a body length separating the lower and upper ends of the handheld body, a longitudinal direction spanning from the lower end of the handheld body to the upper end of the handheld body, and with two flexible opposing sidewalls joined together at a lower joint and at an upper joint and each having an outer surface and an inner surface, wherein the two flexible opposing sidewalls define an enclosed washing aperture with a center diameter separating two opposing inner surfaces of each of the opposing two flexible opposing sidewalls and each of the two flexible opposing sidewalls operably configured to have a static position defining an arcuate shape spanning in the longitudinal direction and a dynamic biased cleaning position with the two opposing sidewalls flexed together inwardly toward the enclosed washing aperture and with a length of the center diameter less than a length of the center diameter when in the static position. The device also includes a plurality of bristles disposed on and radially extending outward from the outer surfaces of each of the two opposing sidewalls.

In accordance with another feature, an embodiment of the present invention includes the two opposing sidewalls are each of a slender polymeric or elastomeric material.

In accordance with a further feature of the present invention, a suction cup is disposed on the lower end of the handheld body.

In accordance with another feature of the present invention, the plurality of bristles on each of the outer surfaces for each of the two opposing sidewalls respectively define an arcuate bristle scrubbing surface when the two flexible opposing sidewalls are in the static position, wherein the arcuate bristle scrubbing surface spanning at least 50% of the body length.

In accordance with yet another feature, an embodiment of the present invention also includes a plurality of bristles disposed on each of the inner surfaces for each of the two opposing sidewalls, radially extending inwardly within the enclosed washing aperture, and each respectively and collectively defining an arcuate bristle scrubbing surface when the two flexible opposing sidewalls are in the static position, the arcuate bristle scrubbing surface spanning at least 25% of the body length.

In accordance with a further feature, an embodiment of the present invention also includes a plurality of bristles disposed at the upper joint, radially extending inwardly within the enclosed washing aperture, and disposed in a substantially perpendicular orientation relative to the plurality of bristles disposed on each of the inner surfaces for each of the two opposing sidewalls.

In accordance with an additional feature, an embodiment of the present invention also includes a plurality of bristles disposed at the upper joint, radially extending outwardly from the outer surface proximal to the upper joint, and disposed in a substantially perpendicular orientation relative to the plurality of bristles disposed on each of the inner surfaces for each of the two opposing sidewalls.

In accordance with yet another feature, an embodiment of the present invention also includes a first scrubbing pad of an abrasive material and directly coupled to an inner surface of one of the two opposing sidewalls and a second scrubbing pad of an abrasive material and directly coupled to an inner surface of another of the two opposing sidewalls.

In accordance with a further feature, an embodiment of the present invention also includes a first textured gripping surface disposed on the outer surface of one of the two opposing sidewalls and proximal to the plurality of bristles disposed on the outer surfaces of one of the two opposing sidewalls and a second textured gripping surface disposed on the outer surface of another of the two opposing sidewalls and proximal to the plurality of bristles disposed on the outer surfaces of another of the two opposing sidewalls.

Although the invention is illustrated and described herein as embodied in a handheld bottle washer, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Unless otherwise stated herein, in this document, the term "longitudinal" should be understood to mean in a direction corresponding to an elongated direction of the device or component.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
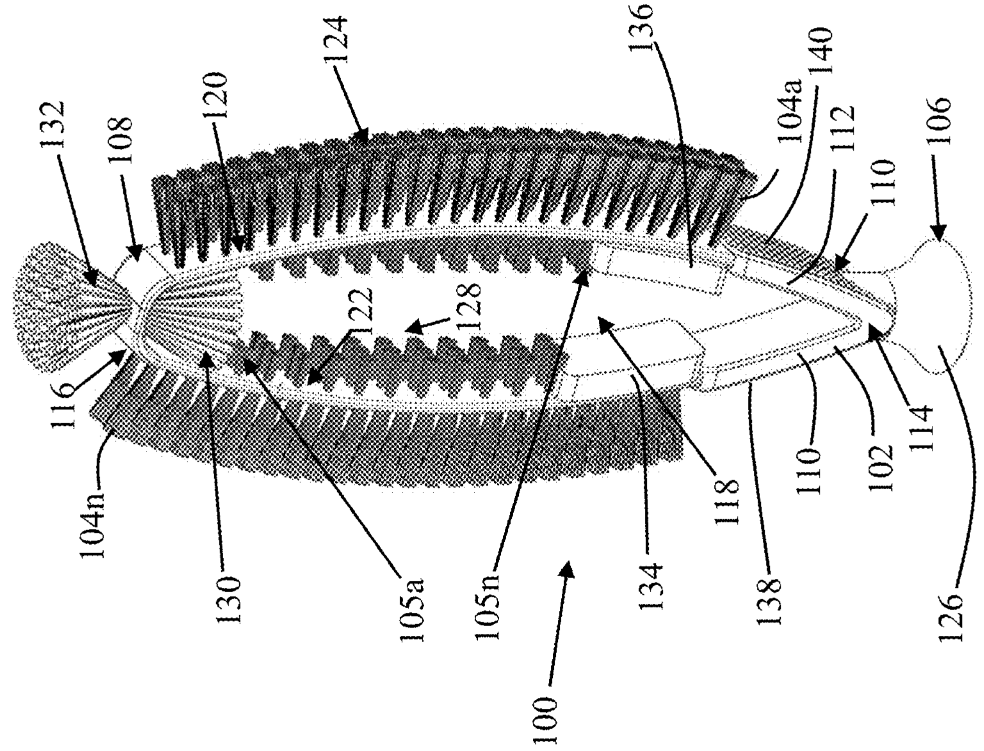
FIG. 1 is a perspective view of a handheld bottle washer in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient handheld bottle washing assembly that effectively cleans a variety of differently sized bottles that have an opening providing entrance into a contained area, e.g., cups, soda bottles, etc. The handheld bottle washing assembly is particularly effective at cleaning bottles having a tapered neck, e.g., baby bottles. Embodiment of the invention also allow users to effectively and efficiently clean utensils and other products.

Figure 2:
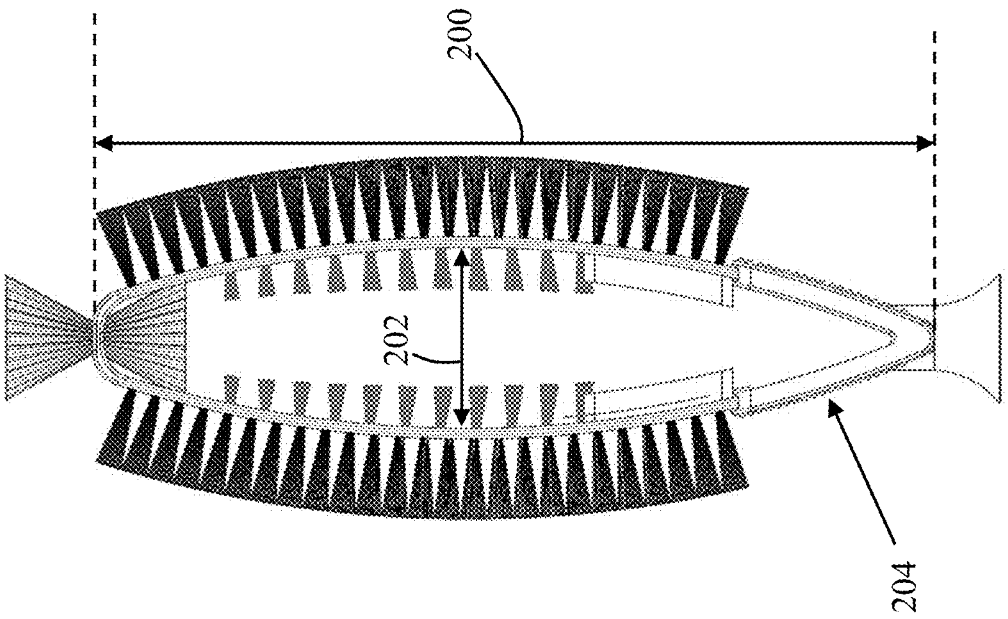
FIG. 2 is a front elevational view of the handheld bottle washer in FIG. 1.
Figure 4:
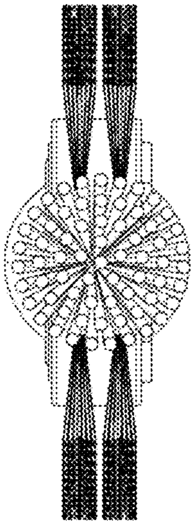
FIG. 4 is a top plan view of the handheld bottle washer in FIG. 1.
Figure 5:
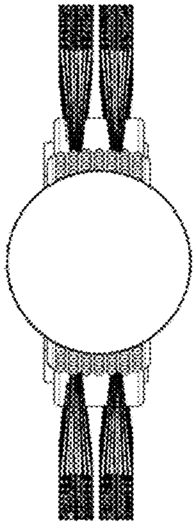
FIG. 5 is a bottom plan view of the handheld bottle washer in FIG. 1.
Figure 3:
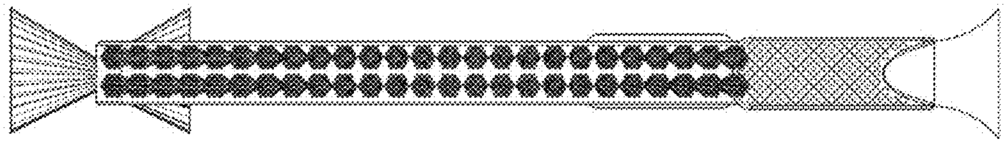
FIG. 3 is a left-side elevational view of the handheld bottle washer in FIG. 1 (wherein the right-side elevational view would look the same)
Figure 6:
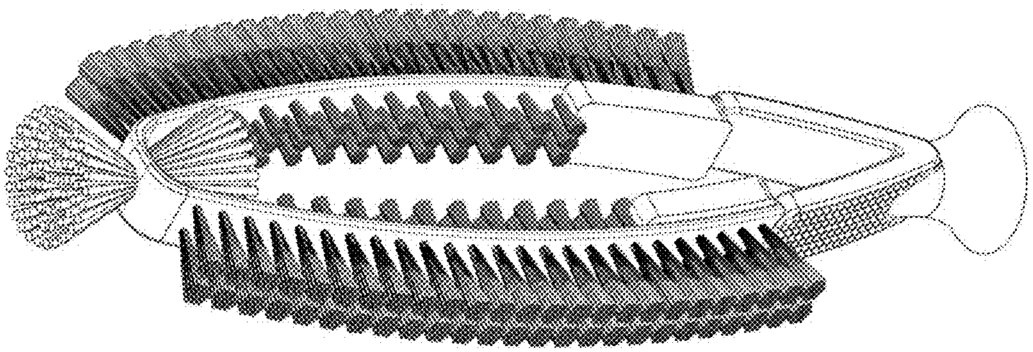
FIG. 6 is another perspective view of the handheld bottle washer in FIG. 1.

Referring now to FIG. 1, one embodiment of the present invention is shown in a perspective view. FIG. 1 shows several advantageous features of the present invention, but, as will be described below, the invention can be provided in several shapes, sizes, combinations of features and components, and varying numbers and functions of the components. The first example of a handheld bottle washer 100, as shown in FIG. 1, includes a handheld body 102 that is preferably formed as a unitary or monolithic structure with two flexible opposing sidewalls 110, 112 joined together at a lower joint 114 and at an upper joint 116. Each of opposing sidewalls 110, 112 include an outer surface 120 with a plurality of bristles 104*a-n* disposed thereon for cleaning the inner surface of a bottle, wherein "n" represents any number greater than one. Each of the flexible opposing sidewalls 110, 112 include an inner surface 122 that may continuously span around the body 102. The inner surface 122 forming the lower and upper joints 114, 116 may be circular, with the upper joint 116 preferably having a wider surface area than the surface area at the lower joint 114 to, for example, beneficially attach bristles 130 thereto. The flexible sidewalls 110, 112 are beneficially able to be compressed (i.e., a dynamic position) by a user to reduce the overall width of the device 100 to allow entrance of the device 100 into the opening of various bottles and then, when the external compression force is released, expand outwardly to enable the plurality of bristles 104*a-n* or other cleaning material (e.g., sponge) to make contact with the inner surface(s) of the bottle for maneuvering by the user and cleaning of the bottle. Furthermore, the device effectuates applying an external force applied by a user downward and the device touching the bottom of the bottle, wherein the sidewalls will flex and follow the natural geometry of the bottle allowing for more contact surface than any other known product. The body 102 is handheld in that it can be grasped by one or both of a typical user's hands without the need for external devices or external forces. With reference to FIGS. 1-2, the handheld body 102 includes a lower end 106, an upper end 108 opposing the lower end 106, a body length 200 separating the lower and upper ends 106, 108 of the handheld body 102, and a longitudinal direction spanning from the lower end 106 of the handheld body 102 to the upper end 108 of the handheld body 102. The ends 106, 108 may, in some embodiments, be the terminal ends of the device 100. In one embodiment, the body length 200 may be approximately 4-36 in. It should be understood that terms such as, "front," "rear," "side," top," "bottom," and the like are indicated from the reference point of a viewer viewing the device 100 as depicted in FIG. 1. Further, the term "wall" is intended broadly to encompass continuous structures, as well as, separate structures that are coupled together so as to form a substantially continuous external surface.

The two flexible opposing sidewalls 110, 112 each have an outer surface 120 and an inner surface 122 that may be substantially planar or smooth. The two flexible opposing sidewalls 110, 112 can be seen defining an enclosed washing aperture 118 with a center diameter 202 separating two opposing inner surfaces 122 of each of the opposing two flexible opposing sidewalls 110, 112. The two flexible opposing sidewalls 110, 112 are beneficially of a slender polymeric material, e.g., polypropylene, and/or an elastomeric material, such as silicone, wherein said materials are water-resistant and capable of repeated bending without ultimate failure. The two opposing sidewalls 110, 112 may be of a width of approximately 0.25-1.5 in or other slender configuration enabling the device to longitudinally fit within the opening of a bottle. In one embodiment, the width of the sidewalls 110, 112 are uniform.

Figure 7:
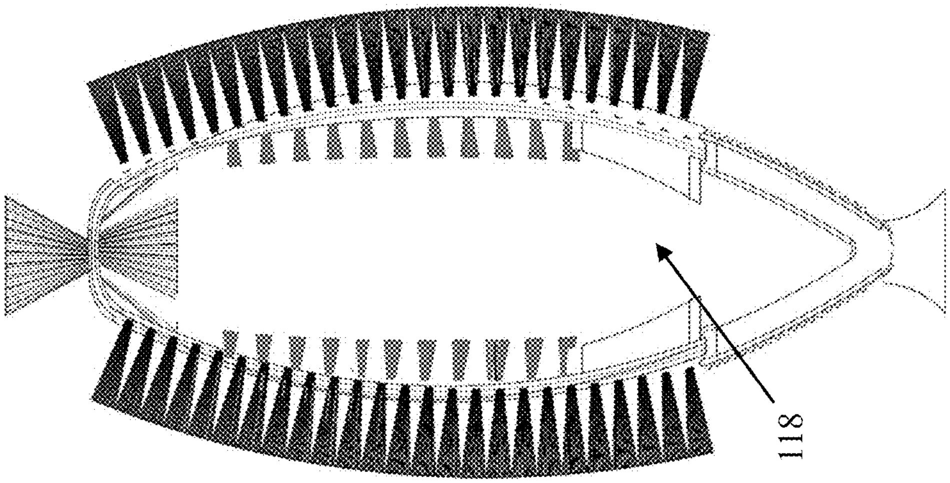
FIG. 7 is an elevational view of the handheld bottle washer in FIG. 1.

Each of the two flexible opposing sidewalls 110, 112 are also operably configured to have a static position (best seen in FIG. 7) defining an arcuate shape (as best seen in FIG. 2 and FIG. 7) spanning in the longitudinal direction and a dynamic biased cleaning position (best seen in FIG. 8) with the two opposing sidewalls 110, 112 flexed together inwardly toward the enclosed washing aperture 118 and with a length of the center diameter 202 less than a length of the center diameter 202 when in the static position, e.g., 1 in versus 0.25 in. The dynamic biased position may be effectuated by an external force applied by a user (e.g., 0.5-2 lbf) on the handle portion (e.g., portion 204) disposed proximal (e.g., at or near, within 25% of the overall length) to the lower end 106 of the device 100. The dynamic biased position may also be effectuated by an external force applied by the sidewalls of the bottle forming the opening in which the device 100 is inserted.

The device also includes a plurality of bristles 104*a-n* disposed on and radially extending outward from the outer surfaces 120 of each of the two opposing sidewalls 110, 112. Each of the bristles 104*a-n* may project at a substantially perpendicular orientation (90°+/−10°) relative to the outer surface 120. The bristles described herein may be of a stiff and/or resilient material, such as synthetic materials such as nylon, and may be relatively abrasive. The bristles may also be made of a material such as polyester, polypropylene, and may extend a length of approximately 0.5-1 in and have a diameter of approximately 0.01-0.1 in. Each of the bristles may be disposed in a tightly spaced configuration, i.e., less than 0.2 in, relative to one another. The plurality of bristles may also be exchanged for a sponge or other material and surface operably configured to clean, i.e., a smooth and non-deformable material would not effectuate the purpose or intent of the present invention.

The plurality of bristles 104*a-n* on each of the outer surfaces 120 for each of the two opposing sidewalls 110, 112 respectively may define an arcuate bristle scrubbing surface 124 when the two flexible opposing sidewalls 110, 112 are in the static position. The arcuate bristle scrubbing surface 124 and bristles may span at least 50% of the body length 200, thereby providing sufficient effective area for cleaning a bottle. In one embodiment, the bristle scrubbing surface 124 may span continuously from a point proximal to the upper end 108 to the grasping portion 114 on opposing sides of the sidewalls 110, 112 (where no bristles or cleaning surface would be located).

In one embodiment, a plurality of bristles 105*a-n* are disposed on each of the inner surfaces 122 for each of the two opposing sidewalls 110, 112 and radially extend inwardly within the enclosed washing aperture 118. Each of the bristles 105*a-n* may collectively defining an arcuate bristle scrubbing surface 128 on each inner surface 122 of the sidewalls 110, 112 when the two flexible opposing sidewalls 110, 112 are in the static position. The arcuate bristle scrubbing surface 128 may span at least 25% of the body length 200 and provides a surface for cleaning utensils, other parts of a bottle, etc. As exemplified in FIG. 8, when the device 100 is placed in the dynamic biased cleaning position, the bristle scrubbing surface 128 are tightly spaced apart (within 0.5 inches), touching, or overlapping with one another to effectively cleaning the utensils, parts of bottle, etc.

Additionally, the device 100 may also include a first scrubbing or cleaning pad 134 directly coupled to an inner surface 122 of one of the two opposing sidewalls 110, 112 and a second scrubbing or cleaning pad 136 directly coupled to an inner surface 122 of another of the two opposing sidewalls 110, 112, wherein it can be seen that each pad 134, 136 faces one another and are also operably configured to be tightly spaced part, touch, or overlap. In one embodiment, the pads 134, 136 are no greater in width than the width of the sidewalls 110, 112 and may be of an abrasive material, wherein some exemplary materials include a flexible and soft rubber or silicone material having a hardness of approximately 20-90 Shore A, a polymeric wire mesh material, a polymeric mesh configuration, or solid material configured with ridges, and/or a ceramic material. In some embodiments, the cleaning pads 134, 136 may be softer than the bristles and may be substantially planar to effectuate a different type of cleaning.

The device 100 may also include a plurality of bristles 130 disposed at the upper joint 116, radially extending inwardly within the enclosed washing aperture 118, and disposed in a substantially perpendicular orientation relative to the plurality of bristles 105*a-n* disposed on each of the inner surfaces 122 for each of the two opposing sidewalls 110, 112. Additionally, the device 100 may also include a plurality of bristles 132 disposed at the upper joint 116, substantially parallel to the plurality of bristles 130, radially extending outwardly from the outer surface 120 proximal to the upper joint 116, and disposed in a substantially perpendicular orientation relative to the plurality of bristles 104*a-n* disposed on each of the inner surfaces 122 for each of the two opposing sidewalls 110, 112. In one embodiment, the plurality of bristles 130, 132 may be 20-50% greater in length than the bristles 104*a-n*, 105*a-n* and may be softer than the bristles 104*a-n*, 105*a-n*.

Figure 8:
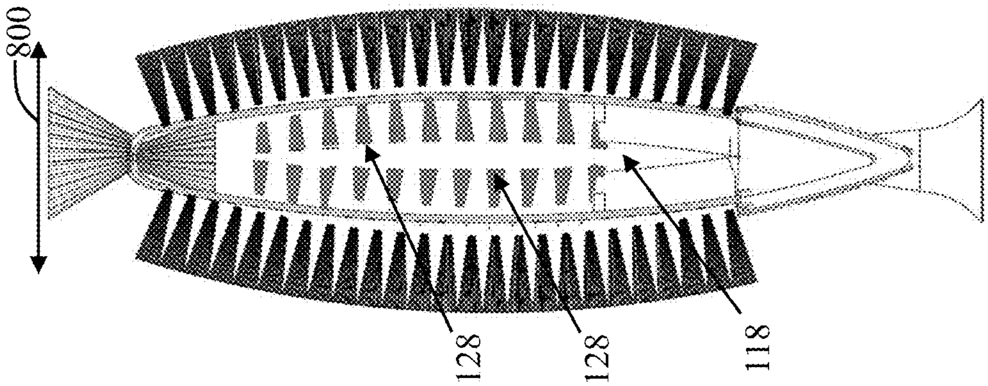
FIG. 8 is a front elevational view of a handheld bottle washer in a static configuration in accordance with one embodiment of the present invention.

In one embodiment, the device 100 includes a first textured gripping surface 138 disposed on the outer surface 120 of one of the two opposing sidewalls 110, 112 and proximal to the plurality of bristles 104*a-n* disposed on the outer surfaces 120 of one of the two opposing sidewalls 110, 112 and a second textured gripping surface 140 disposed on the outer surface 120 of another of the two opposing sidewalls 110, 112 and proximal to the plurality of bristles 104*a-n* disposed on the outer surfaces 120 of another of the two opposing sidewalls 110, 112. The gripping surfaces 138, 140 beneficially provide surfaces for the user to safely grasp and apply the compression force needed to make the device more narrow (than when in its static state or position) for insertion into the bottle for cleaning. With reference to FIG. 8, the device 100 may have a compression or flexing path (exemplified with arrow 800) that includes the static position and various different dynamically biased positions.

In addition, the device 100 may also include a suction cup 126 disposed on the lower (terminal) end of the handheld body 102. The suction cup 106 services two principal purposes. First, it provides a user the ability to conveniently store the handheld bottle washer and second, it provides the user the ability keep the device 100 upright for the user to raise and lower the bottle thereon. This also allows for cleaning with downward force that allows the side walls to flex outward providing more cleaning and scrubbing force to the inner walls of the bottle as the downward force then pushes outward as it pushes the oval design downwards. This provides the full surface contact inside the bottle whatever size or shape it is. Furthermore, this increases the scrubbing power by 100-150% compared to other bottle cleaners or washers. Said another way, each of the two flexible opposing sidewalls 110, 112 can transfer downward force towards the inside surface of a bottle, thereby molding to any bottles geometry and providing scrubbing force. To that end, the suction cup 126 is preferably 1-2 inches in diameter and is configured to resist a longitudinal force of approximately 1-3 lbf without being dislodged.

Figure 10:
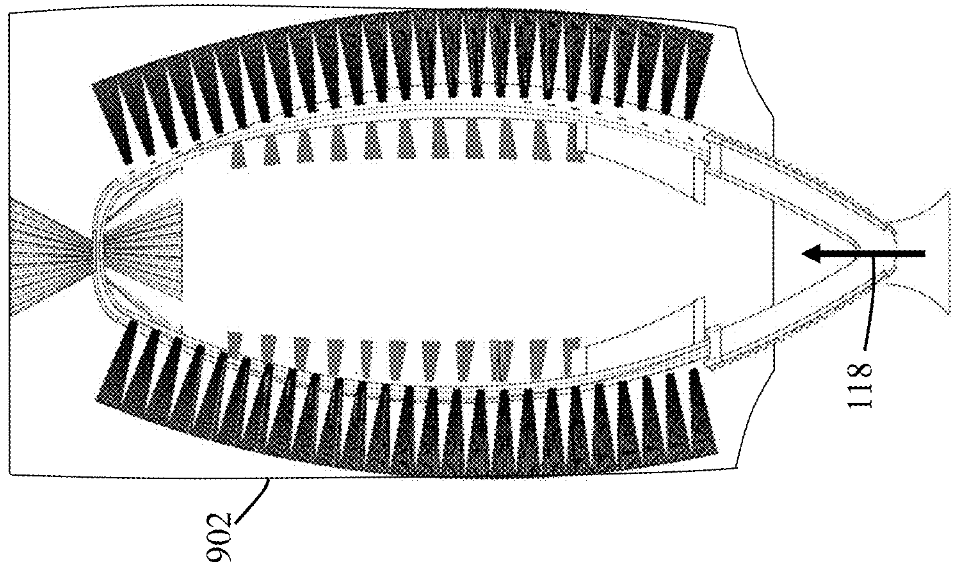
FIGS. 9-10 depict the handheld bottle washer placed in a dynamic state and static state, respectively, in accordance with one embodiment of the present invention.
Figure 9:
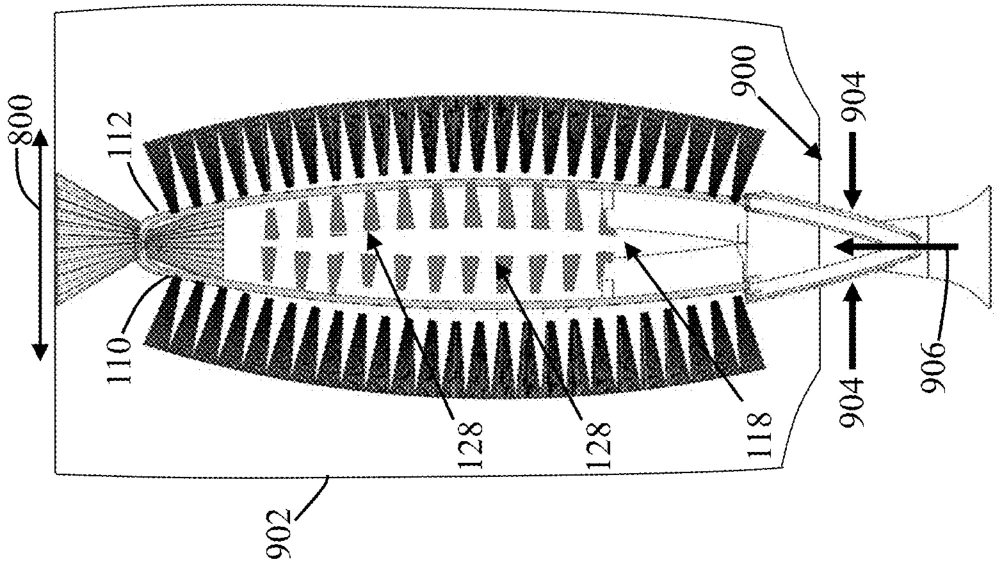

As described above and depicted in FIGS. 9-10, the utilization of the washer 100 includes providing a handheld body with a lower end, with an upper end opposing the lower end, with a body length separating the lower and upper ends of the handheld body, a longitudinal direction spanning from the lower end of the handheld body to the upper end of the handheld body, with two flexible opposing sidewalls joined together at a lower joint and at an upper joint and each having an outer surface and an inner surface, defining an enclosed washing aperture with the two flexible opposing sidewalls, and with a cleaning material disposed on the outer surfaces of each of the two opposing sidewalls. Next, the process includes compressing the two flexible opposing sidewalls 110, 112 with an external compression force 904 (FIG. 9), e.g., with the bottle or by the user, to generate a dynamic position with a diameter of the enclosed washing aperture. Next, the process includes inserting the two flexible opposing sidewalls 110, 112 into an opening 900 of a bottle 902 (i.e., a container with an opening) while in the dynamic position. Further, the process includes releasing the external compression force 904 (FIG. 10) causing the two flexible opposing sidewalls 110, 112 to expand outwardly to generate a static position with the diameter of the enclosed washing aperture greater than the diameter of enclosed washing aperture when in the dynamic position and with the cleaning material on the outer surfaces of each of the two opposing sidewalls contacting the inner surfaces of the bottle 902. Next, the process includes applying a downward force 906 on the lower end of the handheld body to move the cleaning material on the inner surfaces of the bottle for cleaning.

Although a specific order of executing the process steps herein has been disclosed, the order of executing the steps may be changed relative to the order shown in certain embodiments. Also, two or more steps disclosed as occurring in succession may be executed concurrently or with partial concurrence in some embodiments. Certain steps may also be omitted for the sake of brevity. In some embodiments, some or all of the process steps included in FIG. Y can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features.

What is claimed is:

1. A method of utilizing a handheld bottle washer comprising:

providing a handheld body with a lower end, with an upper end opposing the lower end, with a body length separating the lower and upper ends of the handheld body, a longitudinal direction spanning from the lower end of the handheld body to the upper end of the handheld body, with two flexible opposing sidewalls joined together at a lower joint and at an upper joint to form a monolithic structure and each having an outer surface and an inner surface, defining an enclosed washing aperture with the two flexible opposing sidewalls, and with a cleaning material disposed on the outer surfaces of each of the two opposing sidewalls;

grasping the handheld body with one hand of the user and compressing the outer surfaces of each of the two flexible opposing sidewalls with the one hand of the user and between the lower and upper joint with an external compression force to generate a dynamic position with a diameter of the enclosed washing aperture;

inserting the two flexible opposing sidewalls into an opening of a bottle while in the dynamic position;

releasing the external compression force with the one hand of the user thereby causing the two flexible opposing sidewalls to expand outwardly to generate a static position with the diameter of the enclosed washing aperture greater than the diameter of enclosed washing aperture when in the dynamic position and with the cleaning material on the outer surfaces of each of the two opposing sidewalls contacting inner surfaces of the bottle; and applying a downward force on the lower end of the handheld body to move the cleaning material on the inner surfaces of the bottle for cleaning.

2. The method of utilizing a handheld bottle washer according to claim 1, wherein the cleaning material further comprises:

a plurality of bristles disposed on and radially extending outward from the outer surfaces of each of the two opposing sidewalls.

3. The method of utilizing a handheld bottle washer according to claim 2, further comprising:

applying the downward force on the lower end of the handheld body to mold the plurality of bristles disposed on and radially extending outward from the outer surfaces of each of the two opposing sidewalls to a geometry formed by the inner surfaces of the bottle.

4. The method of utilizing a handheld bottle washer according to claim 1, further comprising:

applying the downward force on the lower end of the handheld body to mold the cleaning material a geometry formed by the inner surfaces of the bottle.

5. The method of utilizing a handheld bottle washer according to claim 1, wherein the handheld body further comprises:

a first gripping surface of an arcuate shape and disposed on the outer surface of one of the two opposing sidewalls and a second gripping surface of an arcuate shape and disposed on the outer surface of another of the two opposing sidewalls, the cleaning material formed with a plurality of bristles disposed on and radially extending outward from the outer surfaces of each of the two opposing sidewalls and not located on the first and second gripping surfaces, the first and second gripping surfaces proximal to the plurality of bristles disposed on the outer surfaces of the respective the two opposing sidewalls.

6. The method of utilizing a handheld bottle washer according to claim 1, wherein the handheld body further comprises:

a center diameter separating two opposing inner surfaces of each of the opposing two flexible opposing sidewalls.

* * * * *